(12) United States Patent
Kumada et al.

(10) Patent No.: US 7,098,923 B2
(45) Date of Patent: Aug. 29, 2006

(54) NAVIGATION TERMINAL DEVICE AND NAVIGATION METHOD

(75) Inventors: Satoshi Kumada, Meguro (JP); Toshie Shirahama, Meguro (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 123 days.

(21) Appl. No.: 10/127,503

(22) Filed: Apr. 23, 2002

(65) Prior Publication Data
US 2002/0161512 A1 Oct. 31, 2002

(30) Foreign Application Priority Data
Apr. 27, 2001 (JP) .............................. 2001-133361

(51) Int. Cl.
G09G 5/00 (2006.01)
(52) U.S. Cl. .................. 345/581; 340/539.2; 340/990; 340/995.1; 340/995.12; 340/995.14; 340/995.15
(58) Field of Classification Search ........... 340/426.19, 340/539.2, 903, 990, 995.1, 995.12, 995.14–995.19, 340/995.23, 995.26, 995.27, FOR. 400; 345/581, 345/744, 749, FOR. 185; 379/185; 455/422.1, 455/426.2, 431; 701/200, 201, 207–212; 709/203, 219, FOR. 106, 122
See application file for complete search history.

(56) References Cited

U.S. PATENT DOCUMENTS 5,587,911 A * 12/1996 Asano et al. ............... 701/202
5,612,881 A * 3/1997 Moroto et al. .............. 701/209
5,832,406 A * 11/1998 Iwami et al. ............... 701/202
6,385,538 B1 * 5/2002 Yokota ........................ 701/211
6,430,498 B1 * 8/2002 Maruyama et al. ......... 701/200
6,480,121 B1 * 11/2002 Reimann .................... 340/990
6,661,353 B1 * 12/2003 Gopen ........................ 340/973

FOREIGN PATENT DOCUMENTS

JP          05323872 A     * 12/1993

* cited by examiner

Primary Examiner—Kee M. Tung
Assistant Examiner—G. F. Cunningham
(74) Attorney, Agent, or Firm—Sughrue Mion, PLLC

(57) ABSTRACT

A navigation terminal device includes a map information receiving unit for receiving the map of the region around a reference point from the web server by inputting retrieval information; a display screen for displaying the received map; a route line drawing unit for drawing the destination from the starting point of the reference point by screen scrolling, computing the orientation from the reference point to the destination, and displaying the route line which can be traced from the reference point to the destination; a map information requesting unit for requesting again that the web server distributes the map information of the adjacent peripheral region if the destination is not within the received map of the peripheral region; and a route line re-drawing unit for searching the destination by screen scrolling the updated map information, re-compute the orientation and re-draw the route line.

2 Claims, 4 Drawing Sheets

FIG. 4
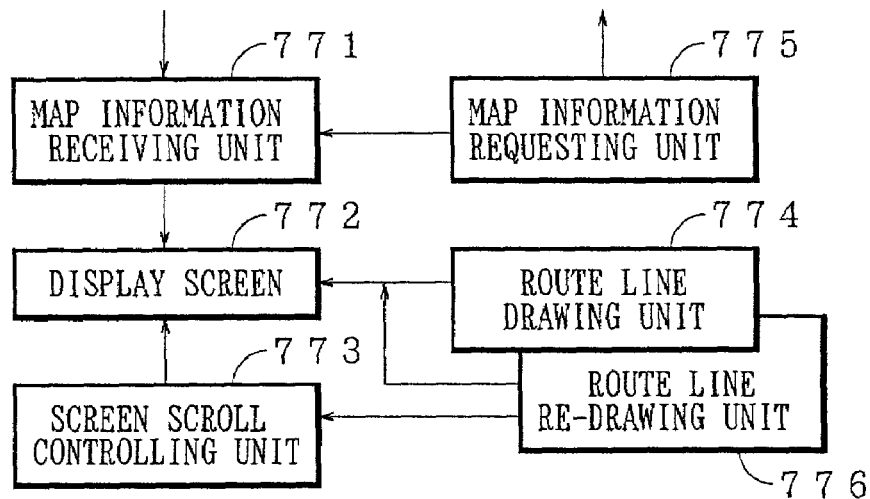
FIG. 6A   FIG. 6B
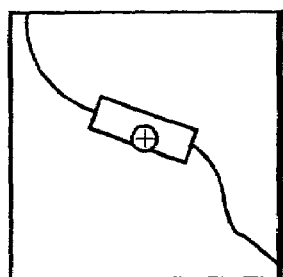 MOVE 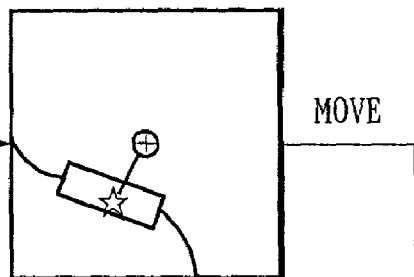 MOVE
FIG. 6C   FIG. 6D
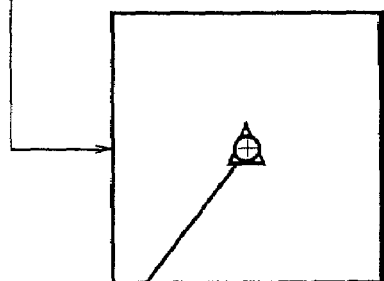 SETTING OF DESTINATION 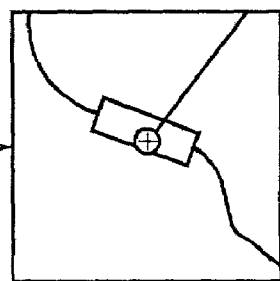

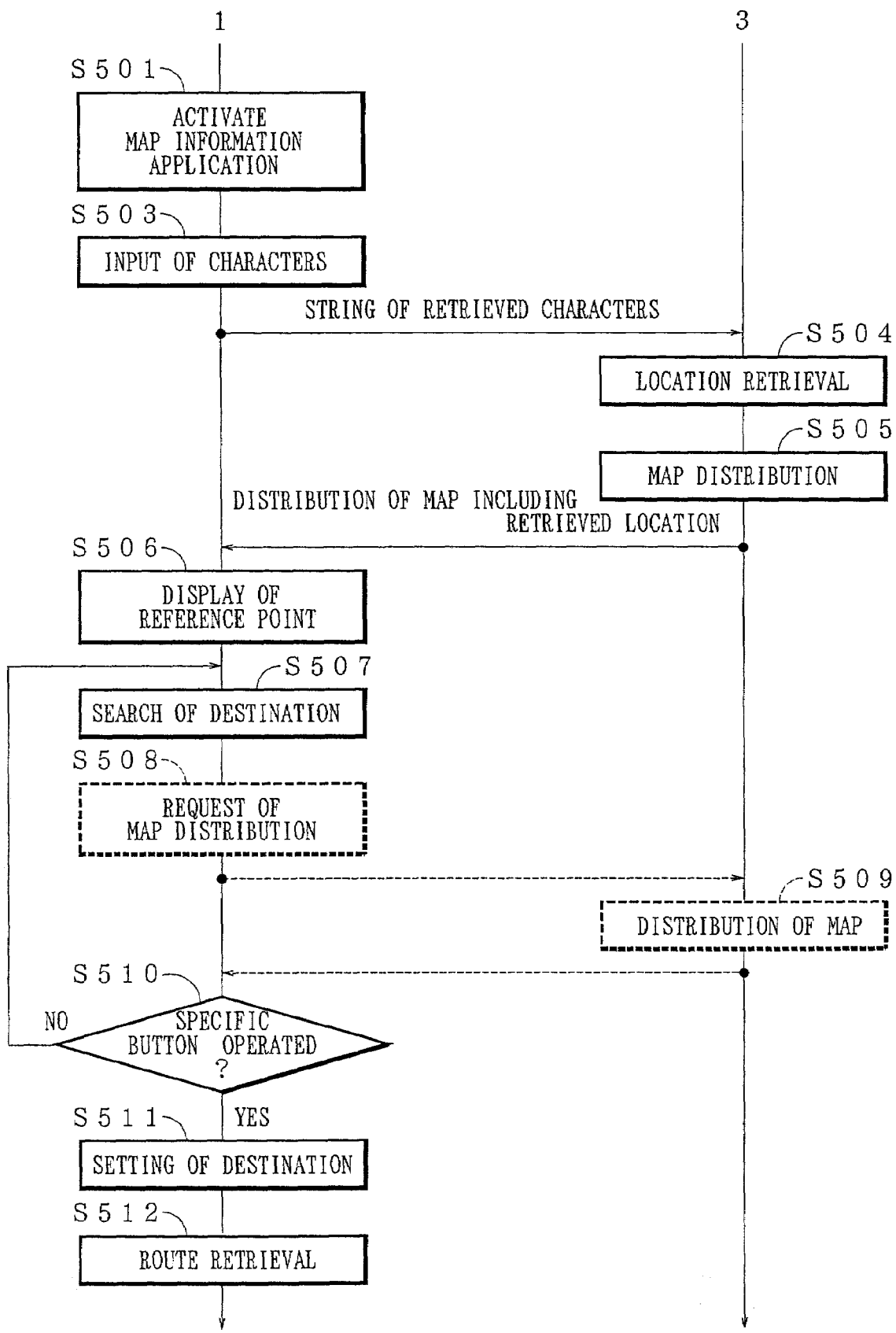

NAVIGATION TERMINAL DEVICE AND NAVIGATION METHOD

BACKGROUND OF THE INVENTION

1. Field of the Invention

This invention relates to a navigation terminal device in which the map information containing location information retrieved by a server is received through a communication line and displayed on a screen, and a method of navigation.

2. Description of the Related Art

At present, various kinds of items of information are provided on an internet via a WWW (World-Wide-Web) from the world. A user can retrieve desired information by operating a terminal device connected to the web.

One of the various kinds of information services is a map information retrieval service. Through this service, the user can acquire desired map information displayed on a terminal by access to the web server containing a map data base and connected to the internet.

Specifically, when the user inputs an address, a place name, a station name or various kinds of facility and store names, the map of the inputted item and its vicinity is displayed on as image information. Therefore, with reference the map information thus displayed, the user can easily recognize where the designated station, facility, etc. is located.

Meanwhile, as a terminal device for the map information retrieval service using the above web, not only a personal computer equipped with a web connecting configuration such as a browser, but also an in-vehicle navigation system, a PDA (Personal Digital Assistants), portable telephone, etc. are used.

However, in the device having a relatively small capacity of screen such as a portable telephone, it is difficult to understand the information on the outskirts of the designated place map-displayed. This requires very troublesome excessive repetition of scrolling. The excessive repetition of scrolling affects not only the operability but waste the communication fee. Sometimes, an objection is raised by a user. This is burden also the side of the terminal.

Unlike the in-vehicle navigation system, the portable telephone does not have the function of displaying a present location or setting a route. Therefore, the present location or destination can be individually retrieved relatively easily. However, it is not easy to follow the route from the present location to the destination and its reverse. Namely, the portable telephone cannot set the user's own position. Therefore, the facility such as a station searched as a guide is set as a starting point. The destination is retrieved from the starting point by repetitive scrolling. In this case, however, the guide disappears from the screen. Therefore, even if the destination is found, it is difficult to follow the route from the guide to the destination. Therefore, the portable telephone is very poor in the operability. This is remarkable in unknown place.

On the other hand, the portable telephone developed in recent years can use the contents on Java (registered trademark) language under the use of web connection. In the service hitherto used, the side of the web starts the program and transmits the retrieval result. In this case, the burden to the navigation terminal is light whereas the that to the web server is heavy. In addition, where the high speed operation is required, comfortable operation sense and dynamic response cannot be obtained.

SUMMARY OF THE INVENTION

This invention has been accomplished in view of the circumstance described above.

An object of this invention is to provide a navigation terminal device and method of navigation which permits a program described in e.g. Java as well as map information to be downloaded when a user accesses the map information in a web server, and permits the program to be started on the memory on a terminal device so that the burden to the web server is reduced and the comfortable sense of operation and dynamic response can be obtained.

Another object of this invention is to provide a navigation terminal device and a method of navigation which can improve the operability in such a manner that map of the region around a reference point is received by inputting retrieval information, a destination is displayed by screen scrolling from a starting point of the reference point, the orientation from the reference point to the destination is computed and the route which can be traced from the reference point to the destination is displayed.

In order to attain the above objects, in accordance with this invention, there is provided a navigation terminal device connected to a server for distributing map information through a communication line comprising:

a map information receiving means for receiving the map of a peripheral region around a reference point from the server by inputting retrieval information; and a route line drawing unit for displaying a destination from the starting point of the reference point on a screen by screen scrolling, and computing the orientation from the reference point to the destination to display a route line which can be traced from the reference point to the destination.

In a preferred embodiment of the navigation terminal device, the route line is represented by a straight line which extends from the center of the map information displayed on the screen to the reference point.

In a preferred embodiment of the navigation terminal device, the navigation terminal device further comprises:

a map information requesting unit for requesting the again that the server distributes the map information of the adjacent peripheral region if the destination is not within the received map of the peripheral region, and a route line re-drawing unit for searching the destination by screen scrolling the updated map information, re-computing the orientation from the reference point to the destination to re-draw the route line which can be continuously traced from the reference point to the destination.

In accordance with this invention, the navigation terminal device and a method of navigation can improve the operability in such a manner that map of the region around a reference point is received by inputting retrieval information, a destination is displayed by screen scrolling from a starting point of the reference point, the orientation from the reference point to the destination is computed and the route which can be traced from the reference point to the destination is displayed. Further, in accordance with this invention, a destination is searched from the map information displayed on a screen by screen scrolling, and the route from a reference point based on the location information retrieved by the web server to the destination is superimposed on the map information on the screen. Where the reference point disappears from the screen when the destination is displayed, the display is exchanged from the destination from the reference point so that a user can follow the route from the displayed reference point to the destination according to the drawn route information.

Thus, the regional information to the destination can be easily recognized by following the route. The terminal device having a small capacity of screen can do without redundant scrolling so that its operability is improved and the burden for the user is relaxed. The display is switched between the reference point and the destination by operating a specific button so that the operability of the terminal device can be further improved. This can be performed in such a manner that the user accesses the map information from the web server to download the program described in e.g. Java as well as the map information and executing the program on the memory of the navigation terminal device. Thus, the burden to the web server can be reduced and the comfortable sense of operation and dynamic response can be obtained.

Incidentally, the route line is drawn in such a manner that the orientation from the reference point to the destination is computed and the computed result is created as a vector having a length and direction.

In order to attain the above objects, there is provided a navigation method comprising the steps of:

distributing map information and a program on the basis of a request from a navigation terminal device which is connected through a communication line to a server which stores map information and the program for displaying it; and running the program on the navigation terminal system to display the distributed map information on the navigation terminal system.

In order to attain the above object, there is provided a navigation method for a navigation system including a server for distributing map information containing location information and a navigation terminal device for displaying on a screen the map information retrieved by the server via a communication line, comprising the steps of:

receiving the map of a peripheral region around a reference point from the server by inputting retrieval information, displaying a destination from the starting point of the reference point on a screen by screen scrolling, and computing the orientation from the reference point to the destination to display a route line which can be traced from the reference point to the destination.

In a preferred embodiment of the navigation method, the navigation method comprises the steps of:

requesting the server again that the server distributes the map information of the adjacent peripheral region if the destination is not within the received map of the peripheral region, searching the destination by screen scrolling the updated map information, and re-computing the orientation from the reference point to the destination to re-display the route line which can be continuously traced from the reference point to the destination.

In order to attain the above objects, there is provided a server program for a navigation system including a server for distributing map information containing location information and a server program for displaying it and a navigation terminal device for displaying on a screen the map information retrieved by the server via a communication line, wherein the server program comprises the steps of:

distributing the map of a peripheral region containing a reference point by receiving retrieval information from the navigation terminal device;

displaying a destination from the starting point of the reference point on a screen by screen scrolling, and computing the orientation from the reference point to the destination to display a route line which can be traced from the reference point to the destination, these steps being by executed by a computer.

In order to attain the above objects, there is provided a navigation terminal program for a navigation system including a server for distributing map information containing location information and a navigation terminal device for displaying on a screen the map information retrieved by the server via a communication line, wherein the navigation terminal program causes a computer to execute the steps of:

receiving the map of a peripheral region around a reference point from the server by inputting retrieval information, displaying a destination from the starting point of the reference point on a screen by screen scrolling, and computing the orientation from the reference point to the destination to display a route line which can be traced from the reference point to the destination.

In a preferred embodiment of a navigation terminal program, the navigation terminal program causes a computer to execute the steps of:

requesting again that the server distributes the map information of the adjacent peripheral region if the destination is not within the received map of the peripheral region, searching the destination by screen scrolling the updated map information, and re-computing the orientation from the reference point to the destination to re-display the route line which can be continuously traced from the reference point to the destination.

In order to attain the above objects, there is provided a recording medium readable by a computer which stores a server program for a navigation system including a server for distributing map information containing location information and a server program for displaying it and a navigation terminal device for displaying on a screen the map information retrieved by the server via a communication line, wherein the server program comprises the steps of:

distributing the map of a peripheral region containing a reference point by receiving retrieval information from the navigation terminal device;

displaying a destination from the starting point of the reference point on a screen by screen scrolling, and computing the orientation from the reference point to the destination to display a route line which can be traced from the reference point to the destination, these steps being by executed by a computer.

In order to attain the above objects, there is provided a recording medium readable by a computer which stores a navigation terminal program for a navigation system including a server for distributing map information containing location information and a server program for displaying it and a navigation terminal device for displaying on a screen the map information retrieved by the server via a communication line, wherein the navigation terminal program causes the computer to execute the steps of:

receiving the map of a peripheral region containing a reference point by receiving retrieval information;

displaying a destination from the starting point of the reference point on a screen by screen scrolling, and computing the orientation from the reference point to the destination to display a route line which can be traced from the reference point to the destination.

In a preferred embodiment of the recording medium, the the navigation terminal program causes a computer to execute the steps of:

requesting again that the server distributes the map information of the adjacent peripheral region if the destination is not within the received map of the peripheral region, searching the destination by screen scrolling the updated map information, and re-computing the orientation from the reference point to the destination to re-display the route line which can be continuously traced from the reference point to the destination.

The above and other objects and features of this invention will be more apparent from the following description taken in conjunction with the accompanying drawings.

BRIEF DESCRIPTION OF THE DRAWINGS

FIG. 4 is a block diagram showing the internal configuration expanded in function of a map information application shown in FIG. 3;

FIG. 5 is an operation sequence for explaining the operation of an embodiment of this invention; and FIGS. 6A to 6D are views each showing a screen configuration of a navigation terminal device for explaining the embodiment of this invention.

DESCRIPTION OF THE PREFERRED EMBODIMENTS

Figure 1:
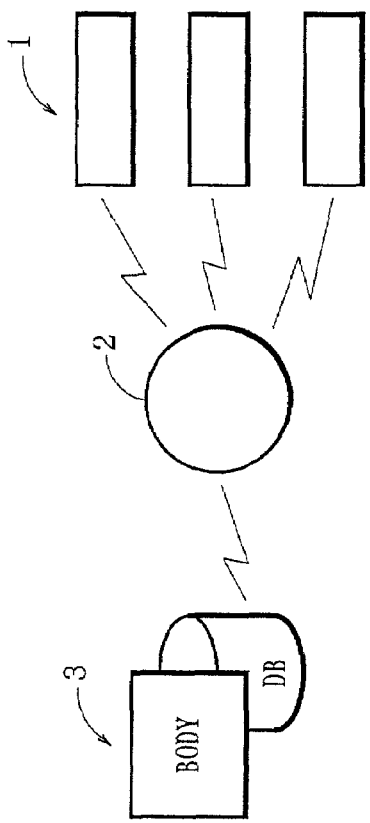
FIG. 1 is a view showing an example of a connecting format to which this invention is applied.

Now referring to the drawings, a detailed explanation will be given of a preferred embodiment of this invention.

FIG. 1 is a view showing the connecting format of a navigation system to which this invention is applied. In FIG. 1, reference numeral 1 denotes individual navigation terminal devices each having a browser function as a client; 2 an internet; and 3 a web server.

Now, a portable telephone having a web connecting configuration is illustrated as the navigation terminal device 1. The portable telephone having a relatively small capacity of screen is connected to the internet 2 though a public switched network or an access service. The internet 2 is connected to a web server 3 which serves as a map information providing site, a map information data base site and a route setting site.

The map information providing site is a site for carrying out the service of providing the map information by WWW. The map information providing site unifies the information supply to the map data base site and the route setting site described later.

The map information providing site includes, as a web server 3, a data base (DB) in which the land marks such as addresses and facilities and their location information. The web server 3 accesses the data base on the basis of the input information from the navigation terminal device 1 so that the address or facility is specified from the input location information and the corresponding location information is acquired from the specified land mark.

The map data base site is a site for carrying out the retrieval/display service of the map information on the internet so that the map data read out is supplied to the navigation terminal device 1. The map data base site includes a map server for supplying map data read out to the navigation terminal device 1 and a map information data base in which location information indicative of the coordinates by latitudes and longitudes, display information of the map such as a reduced scale, map size, etc. and the image data of the map corresponding to these items of information are stored.

Figure 2:
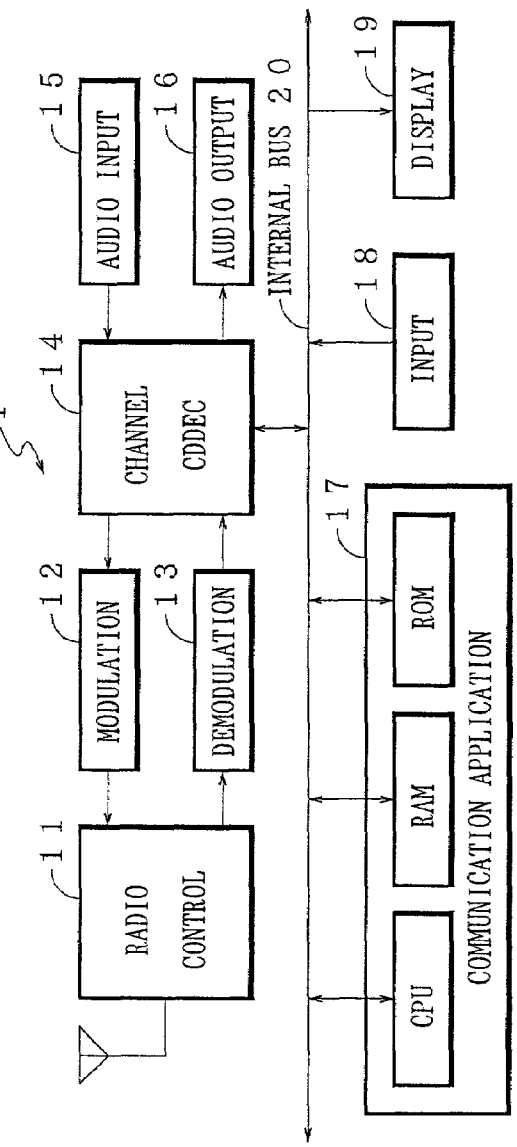
FIG. 2 is a block diagram showing an internal configuration of a navigation terminal device 1 in FIG. 1.

FIG. 2 is a block diagram showing the internal configuration of the navigation terminal device 1 in FIG. 1. As described above, as the navigation terminal device 1, the portable telephone provided with the web connecting configuration is illustrated.

The navigation terminal device 1 includes a radio control unit 11, a modulating unit 12, a demodulating unit 13, a channel codec 14, an audio input unit 15, an audio input unit 16, a communication application unit 17, an input unit 18 and a display unit 19. The radio control unit 11, channel codec 14, communication application unit 17, input unit 18 and display unit 19 are commonly connected to an internal bus 20.

The radio control unit 11 serves to transmit modulated data supplied by the modulating unit 12 from an antenna together with a radio carrier wave and receives the signal at a prescribed frequency form the high frequency signals induced at the antenna. The modulating unit 12 serves to modulate the transmission data outputted from the channel codec 14 in a prescribed system (e.g. $\pi/4$ shift DPQSK) and supplies the modulated data to the radio control unit 11. The demodulating unit 13 serves to demodulate the signal received by the radio control unit 11 and supplies the signal thus demodulated to the channel codec 14.

The channel codec 14 divisionally supplies the data received from the demodulating unit 13 to the audio output unit 16 or the communication application 17. The channel codec 14 also divisionally supplies the audio received from the audio input unit 15 to the modulating unit 12 or the communication application unit 17. The channel codec 14 also divisionally supplies the data received from the communication application unit 17 to the modulating unit 12 or the audio output unit 16.

The communication application unit 17 includes a CPU, ROM and RAM and serves as a control center for the navigation terminal device 1 which performs not only the connecting control for communication but also control for the creation of the transmission data, display/reserve of the received data and processing of the received/transmitted data. The details thereof will be explained later.

The input unit 18 recognizes the connected key or button to input a dialing number and display image operating data. The display unit 19 displays, on a connected screen display monitor, the data produced from the communication application unit 17 and stored in the display memory not shown.

Figure 3:
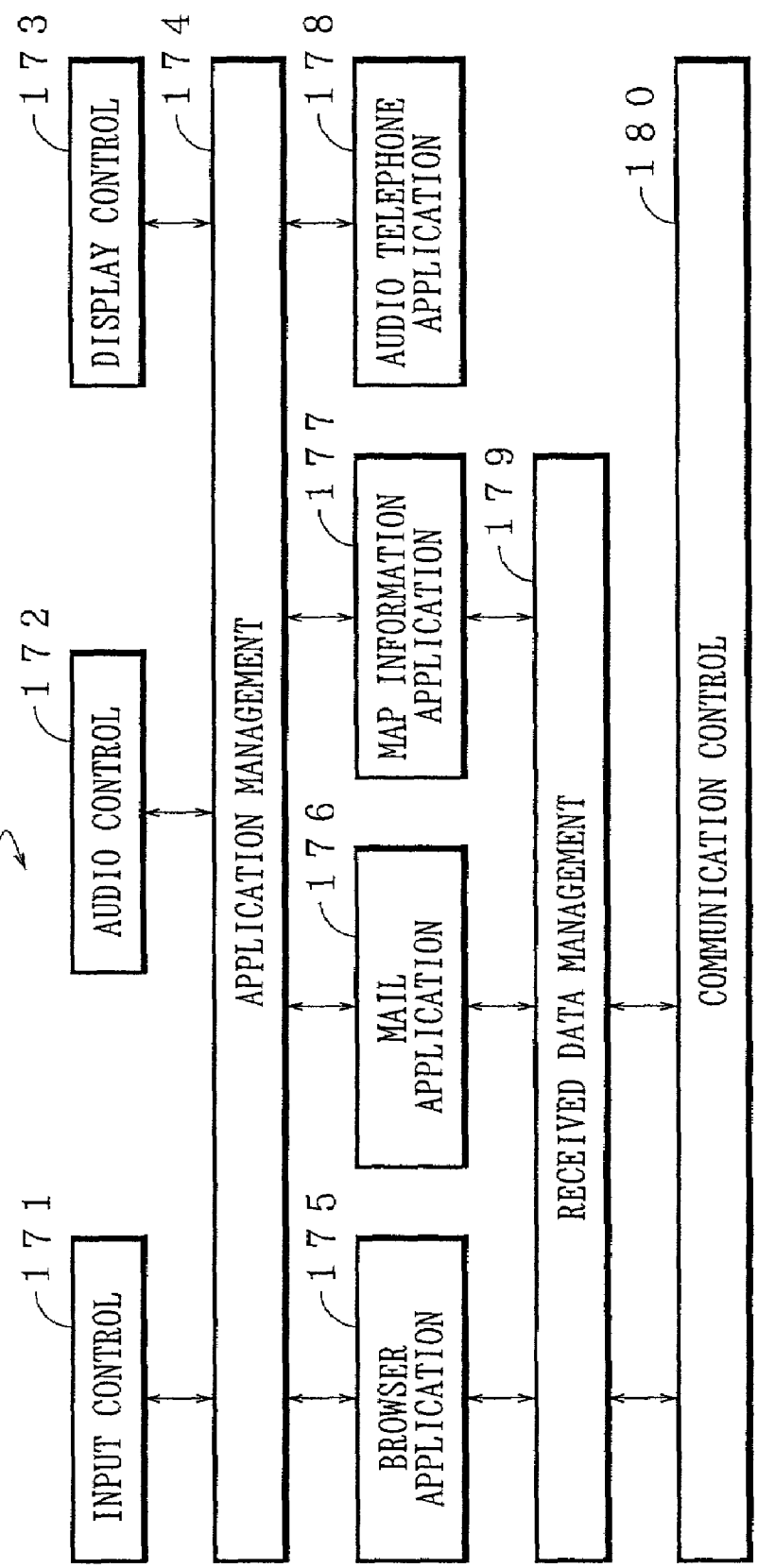
FIG. 3 is a block diagram showing the internal configuration expanded in function of a communication application unit 37 shown in FIG. 2.

FIG. 3 is a developed block diagram of the internal configuration of the communication application unit 17 as shown in FIG. 2. Concretely, the communication application unit 17 is constructed of a peripheral LSI such as an input unit 18, display unit 19, etc. inclusive of the CPU, ROM/RAM. The function of each block described later is realized in such a manner that CPU reads the program stored in the ROM and executes it using the RAM.

The communication application unit 17 includes an input control unit 171, an audio control unit 172, a display control unit 173, an application management unit 174, a browser application 175, a male application 176, a map information application 177, an audio telephone application 178, a received data management unit 179 and a communication control unit 180.

The input control unit 171 informs the application management unit 174 of the input key information and others received from the input unit 18. The display control unit 173 performs the control of supplying the display information received from the application management unit 174 to the display unit 19. The audio control unit 172 performs the control of informing the application management unit 174 of the audio received from the audio input unit 15 or supplying the audio received from the application management unit 174 to the channel codec 14.

The application management unit 174 performs the management of selecting one of a plurality of applications prepackaged in the navigation terminal device 1 according to this invention, or exchanging the information between each application and the input control unit 171, display control unit 173, audio control unit 172. It is now assumed that four applications of the browser application 175, male application 176, map information application 177 and audio telephone application 178 have been prepackaged. However, it is needless to say that any other application can be also prepackaged.

The applications to be prepackaged are classified into applications designed for the audio service and for the character service. The former does not carry out the transmission/reception of character data and image data, but supports the audio. The audio telephone application 178 is an example thereof. The latter does not carry out the transmission/reception of the character data and image data such as a map and supports the screen display of each item of information to be transmitted or received. The browser application 175, male application 176 and the map information application 177 are examples thereof.

Incidentally, although not shown, it is assumed that the communication application unit 17 includes a Java executing environment for executing the map information application 177.

The internal configuration expanded in function of the map information application 177 is shown in FIG. 4. The map information application 177 includes a map information receiving unit 771, a display screen 772, a screen-scroll controlling unit 773, a route line drawing unit 774, a map information requesting unit 775 and a route line re-drawing unit 776.

The map information receiving unit 771 serves to receive the map of the region around a reference point from the web server 3 by inputting retrieval information. The received map is displayed on the display screen 772. The route line drawing unit 774 serves to draw the destination from the starting point of the reference point by screen scrolling using the screen scroll controlling unit 773, compute the orientation from the reference point to the destination, and display the route line which can be traced from the reference point to the destination.

Incidentally, it should be noted that the route line is represented by drawing the straight line extending from the center of the map information displayed on the display screen 772 to the reference point.

The map information requesting unit 775 serves to request again that the web server 3 distributes the map information of the adjacent peripheral region if the destination is not within the received map of the peripheral region.

The route line re-drawing unit 776 serves to search the destination by screen scrolling the updated map information, re-compute the orientation from the reference point to the destination and re-draw the route line which can be continuously traced from the reference point to the destination.

Again referring to FIG. 3, the communication control unit 180 performs the dialing/calling connection and data communication control according to the command from each of the applications 175, 176, 177 and 178. The received data managing unit 179 is located between the communication control unit 180 and each of the browser application 175, male application 176 and map information application 177 to manage the received data to be transferred from the former to the latter.

FIG. 5 is an operation sequence chart for explaining the operation of the navigation system according to this invention in the relationship between the navigation terminal device 1 and the web server 3. FIG. 6 shows an example of screen display.

Now referring to FIGS. 5 and 6, an explanation will be given of the operation of the navigation system according to the embodiment of this invention.

First, a user accesses the map information site by operating the navigation terminal device 1 to download the map information application (step S501). The user designates a prescribed facility, such as a station, department store, convenience store, public facility, etc., which is used as a reference point, or otherwise requests the web server 3 to distribute the map information in a prescribed region by specifying the address, place name or postal number, etc. by character inputting (step S503).

The web server 3 receives the inputted character to retrieve the facility and map data base, and distribute the map information in a reduced scale containing the facility centered thereon to the navigation terminal device 1 (steps S504, S505). At this time, the map information application 177 is downloaded to the navigation terminal device 1.

The navigation terminal device 1 stores the downloaded map information application 177 in the RAM incorporated in the communication application unit 17, and initiates the map information application 177 so that the map information distributed previously is received to display the map information containing the outskirt of the centered facility used as the reference point. This is performed by the map information application 771. FIG. 6A shows an example of the screen display. Now, the station used as the reference point is centered on the screen (step S506).

Next, the user will move toward his destination while carrying the navigation terminal device 1. However, before he moves, he operates the navigation terminal device 1 to search the destination. The searching of the destination is performed by scrolling the screen using the screen scroll control unit 773 (step S507).

Now it is assumed that when the destination is displayed by the destination display unit, the station which is the previous reference point has disappeared from the screen. FIG. 6B shows the screen display in this case.

However, the route line represented by the straight line connecting the reference point to the destination is left on the screen of the navigation terminal device 1. This is carried out by the route line drawing unit 774. FIG. 6C shows the screen display in this case. The route line drawing unit 774 draws the route connecting a reference point of the location information retrieved by the web server 3 to the destination so as to be superimposed on the screen with the map information displayed thereon.

The route line is drawn in such a manner that the orientation from the reference point to the destination is computed by an operation routine incorporated in the route line drawing unit 774, and the computed result is created as a vector having a length and direction. The vector is displayed as a straight line on the screen so that the user can follow the route from the reference to the destination (step S512).

The navigation terminal device according to this invention has a function of holding the reference point and exchange display between the reference point and destination by detecting the fact that a specific button has been operated (steps S510, 511). FIG. 6D shows an example of the display screen in this case.

The user can follow the route from the displayed reference point to the destination and its reverse according to the route line information drawn on the screen of the navigation terminal device 1 (step S512).

During the process from step S506 (display of the reference point) to step 511 (setting of the destination), the navigation terminal device 1 requests the web server 3 to distribute the map information of a prescribed region as the occasion demands (step S508) and receives the distributed map information (step S509) (both indicated by dotted lines). This is carried out by the map information requesting unit 775. Where the destination is not included in the map of the outskirt previously received, the navigation terminal device 1 requests the web server 3 to distribute the map information of the neighboring outskirt again.

The destination is searched on the basis of the distributed updated map information by scrolling. The route line re-drawing unit 776 draws the route from the reference point to the destination on the screen again by computing the orientation from the reference point to the destination. Even when the map information is updated, the user can follow the route line from the reference point to the destination which has been re-drawn on the screen by the route line re-drawing unit 776.

The navigation terminal device 1 receives, from the web server 3, the information of the reference point and destination within a prescribed distance from the displayed center point. The direction from the center point to the reference point or destination and the distance therebetween are computed, and they are created and drawn as segment information. It is now assumed that the length of the segment representative of the orientation is set according to the distance.

In the above embodiment of this invention, the map information was distributed from the web server 3. However, it may be prepared on the side of the navigation terminal device 1. Although the navigation terminal device 1 access the web server 3 to acquire the location information when the destination is set, it may inherently have the location information.

Further, the navigation terminal device 1 should not be limited to the portable telephone adopted in the embodiment. The PDA, home personal computer, in-vehicle navigation device may be used as the navigation terminal device 1. The navigation system according to this invention may be applied to not only the communication network via the internet, but a closed system using the recording medium such as CD-ROM, DVD, etc. In the above embodiment, the map information application was downloaded from the web server 3, but it may be stored previously.

Incidentally, the procedure shown as a sequence chart in FIG. 5 is previously programmed or recorded in the navigation terminal device 1 and the web server 3, and the read program is executed by CPU. However, the program is recorded in the recording medium such as a semiconductor memory, optical disk, hard disk, floppy disk, etc. Further, the program is not fixed on these recording media, but may be downloaded via a communication line.

Incidentally, the contents of Japanese Patent Application No. 2001-133361 filed on Apr. 27, 2002 are hereby incorporated by reference.

What is claimed is:

1. A navigation terminal device connected to a server through a communication line for requesting map information from the server, said navigation terminal device comprising:
    a map information receiving unit for receiving maps, of a peripheral region around a reference point, from the server by inputting retrieval information about the reference point;
    a route line drawing unit for computing an orientation from the reference point to a destination, and for superimposing a straight route line on the maps for tracing a route from the reference point to the destination;
    a map information requesting unit for requesting again that the server distributes the map information of the adjacent peripheral region if the destination is not within the received map of the peripheral region, and
    a route line re-drawing unit for searching the destination by screen scrolling the updated map information, re-computing the orientation from the reference point to the destination to re-draw the route line which can be continuously traced from the reference point to the destination.

2. A navigation terminal device connected to a server through a communication line for requesting map information from the server, said navigation terminal device comprising:
    a receiving circuit that receives maps, of a peripheral region around a reference point, from the server by inputting retrieval information about the reference point;
    a control circuit that computes an orientation from the reference point to a destination, and superimposes a straight route line on the maps for tracing a route from the reference point to the destination,
    wherein said receiving circuit receives the map again if the destination is not within the received map of the peripheral region, and
    wherein the control unit re-computes the orientation from the reference point to the destination to re-draw the route line which can be continuously traced from the reference point to the destination.

* * * * *